US010972007B2

(12) United States Patent
Dankert et al.

(10) Patent No.: US 10,972,007 B2
(45) Date of Patent: Apr. 6, 2021

(54) SENSE CIRCUIT FOR BUCK CONVERTER CIRCUIT

(71) Applicant: Apple Inc., Cupertino, CA (US)

(72) Inventors: Floyd L. Dankert, Austin, TX (US); Jitendra K. Agrawal, Fremont, CA (US); Dingkun Du, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 84 days.

(21) Appl. No.: 16/290,794

(22) Filed: Mar. 1, 2019

(65) Prior Publication Data

US 2020/0280257 A1 Sep. 3, 2020

(51) Int. Cl.
| | | |
|---|---|---|
| *G06F 1/32* | (2019.01) | |
| *H02M 3/158* | (2006.01) | |
| *H02M 1/08* | (2006.01) | |
| *G06F 1/28* | (2006.01) | |
| *G06F 1/3296* | (2019.01) | |
| *H02M 1/00* | (2006.01) | |
| *G06F 1/3203* | (2019.01) | |

(52) U.S. Cl.
CPC ............. *H02M 3/158* (2013.01); *G06F 1/28* (2013.01); *G06F 1/3296* (2013.01); *H02M 1/08* (2013.01); *G06F 1/3203* (2013.01); *H02M 2001/0009* (2013.01)

(58) Field of Classification Search
CPC .................. H02M 3/158; H02M 1/08; H02M 2001/0009; G06F 1/28; G06F 1/3296
USPC .......................................................... 713/320
See application file for complete search history.

(56) References Cited

U.S. PATENT DOCUMENTS

| | | | |
|---|---|---|---|
| 7,737,668 B2 | 6/2010 | Oswald et al. | |
| 8,049,472 B2 | 11/2011 | Easwaran et al. | |
| 8,879,217 B2 | 11/2014 | Tang et al. | |
| 9,088,211 B2 | 7/2015 | Ivanov et al. | |
| 9,281,116 B2 | 3/2016 | Lee et al. | |
| 9,935,553 B2 | 4/2018 | Svorc et al. | |
| 2009/0066301 A1* | 3/2009 | Oswald | H02M 3/1582 323/271 |
| 2010/0026267 A1* | 2/2010 | Easwaran | H02M 3/158 323/288 |
| 2012/0153913 A1* | 6/2012 | Wan | H02M 3/1588 323/282 |
| 2012/0217946 A1* | 8/2012 | Ju | H02M 3/156 323/285 |
| 2013/0335058 A1* | 12/2013 | Mercer | H02J 1/06 323/318 |
| 2014/0002932 A1* | 1/2014 | Tang | H02M 1/32 361/18 |

(Continued)

*Primary Examiner* — Volvick Derose
(74) *Attorney, Agent, or Firm* — Kowert, Hood, Munyon, Rankin & Goetzel, P.C.

(57) ABSTRACT

A voltage regulator circuit included in a computer system may include multiple devices and a switch node coupled to a regulated power supply node via an inductor. The voltage regulator circuit may, using different subsets of the multiple devices, charge a capacitor for a first period of time and then couple the switch node to the capacitor for a second period of time. A control circuit may sense, using a common circuit, different characteristics of a current through the inductor during respective operation modes, and adjust the first and second periods of time based on the different characteristics of the current and a current operation mode.

20 Claims, 6 Drawing Sheets

(56) References Cited

U.S. PATENT DOCUMENTS

| | | | | |
|---|---|---|---|---|
| 2014/0009130 A1* | 1/2014 | Galbis | .................... | H02M 3/156 |
| | | | | 323/271 |
| 2014/0218007 A1* | 8/2014 | Vogman | .............. | G06F 11/3024 |
| | | | | 324/76.11 |
| 2014/0266120 A1* | 9/2014 | Isham | .................... | H02M 3/157 |
| | | | | 323/283 |
| 2016/0268885 A1* | 9/2016 | Kumar | .................. | H02M 3/156 |
| 2016/0306371 A1* | 10/2016 | Svorc | .................. | H02M 3/1588 |

* cited by examiner

| Mode | Switching Cycle | Function | DAC enabled | Comparator | |
|---|---|---|---|---|---|
| | | | | Positive Input | Negative Input |
| CCM High Duty | 1,2 | Current Limit | Yes | Input Supply | Capacitor Node |
| CCM Low Duty | 1,3 | Current Limit | Yes | Input Supply | Capacitor Node |
| | 2,4 | Current Limit | Yes | Capacitor Node | Switching Node |
| DCM Low Duty | 1,3 | Disabled | No | Input Supply | Input Supply |
| | 2,4 | | | | |
| DCM High Duty | 1,3 | Zero Crossing | No | Capacitor Node | Switching Node |
| | 2,4 | Zero Crossing | No | Input Supply | Input Supply |

SENSE CIRCUIT FOR BUCK CONVERTER CIRCUIT

BACKGROUND

Technical Field

This disclosure relates to power management in computer systems and more particularly to voltage regulator circuit operation.

Description of the Related Art

Modern computer systems may include multiple circuits blocks designed to perform various functions. For example, such circuit blocks may include processors, processor cores configured to executed execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more voltage regulator circuits configured to generated regulator voltage levels on respective power supply signals using a voltage level of a source power supply signal. Such regulator circuits may employ multiple passive circuit elements, such as inductors, capacitors, and the like.

SUMMARY OF THE EMBODIMENTS

Various embodiments of a method for power monitoring of a computer system are disclosed. Broadly speaking, a voltage regulator circuit including a plurality of devices and a switch node coupled to a regulated power supply node via an inductor, wherein the voltage regulator circuit may be configured to couple the switch node to a capacitor using different ones of the plurality of devices that are selected based on one or more control signals, and charge the capacitor using an input power supply signal based on the one or more control signals. A control circuit may be configured to sense a current through the inductor using a voltage level across the capacitor, a voltage level of the switch node, and a voltage level of the input power supply signal, and adjust the one or more control signals based on a value of the current through the inductor. In some embodiments, the control circuit may be further configured to adjust, during a first operation mode, the one or more control signals based on a zero-level crossing of the current through the inductor.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Computer systems may include multiple circuit blocks configured to perform specific functions. Such circuit blocks may be fabricated on a common substrate and may employ different power supply voltage levels. Power management units (commonly referred to as "PMUs") may include multiple voltage regulator circuits configured to generate regulated voltage levels for various power supply signals. Such voltage regulator circuits may employ both passive circuit elements (e.g., inductors, capacitors, etc.) as well as active circuit elements (e.g., transistors, diodes, etc.).

Different types of voltage regulator circuits may be employed depending upon power requirements of load circuits, available circuit area, and the like. Such converter circuits include multiple devices and a switch node that is coupled to a regulated power supply node via an inductor. Energy is supplied to the regulator power supply node via the inductor according to a switching sequence. As used herein, a switching sequence refers to an order in which different sets of devices in a voltage regulator circuit are activated in order to couple an inductor included in the voltage regulator circuit to different power supply voltage levels or components at different times.

To reduce transients in the current flowing through the inductor into a load circuit coupled to the voltage regulator circuit, different circuit topologies of voltage regulator circuits may be employed. For example, in some cases, a three-level buck converter circuit topology may be employed to reduce current transients. In a three-level buck converter circuit, rather than connecting the inductor to a power supply node, it is coupled to a capacitor (commonly referred to as a "fly capacitor"), which has been charged to a voltage level less than that of the power supply node. Since the voltage level across the fly capacitor is less that the voltage level of the power supply, the change in the current flowing through the inductor is less.

Three-level buck converters can be operated in different operation modes. In one mode, current flows the inductor in each cycle of the multiple switching cycles included in a given switching sequence. Such modes are referred to as continuous conduction modes. Alternatively, in another mode, no current may flow in the inductor in one or more of the cycles. This type of mode is referred to as discontinuous conduction mode.

In continuous conduction mode, the active (or "on time") of a cycle is based on when the current flowing through the inductor reaches a threshold limit. In discontinuous conduction mode, the active time of a cycle is determined based on when the current through the inductor is detected as crossing a zero-level. To detect these different characteristics of the current flowing through the inductor, specialized sense circuits may be employed to detect each characteristic. The use of dedicated circuits results in additional circuit area and power dissipation. The embodiments illustrated in the drawings and described below may provide techniques for detecting different characteristics of a current flowing through an inductor in a voltage regulator circuit, while minimizing the impact on area and power dissipation.

Figure 1:
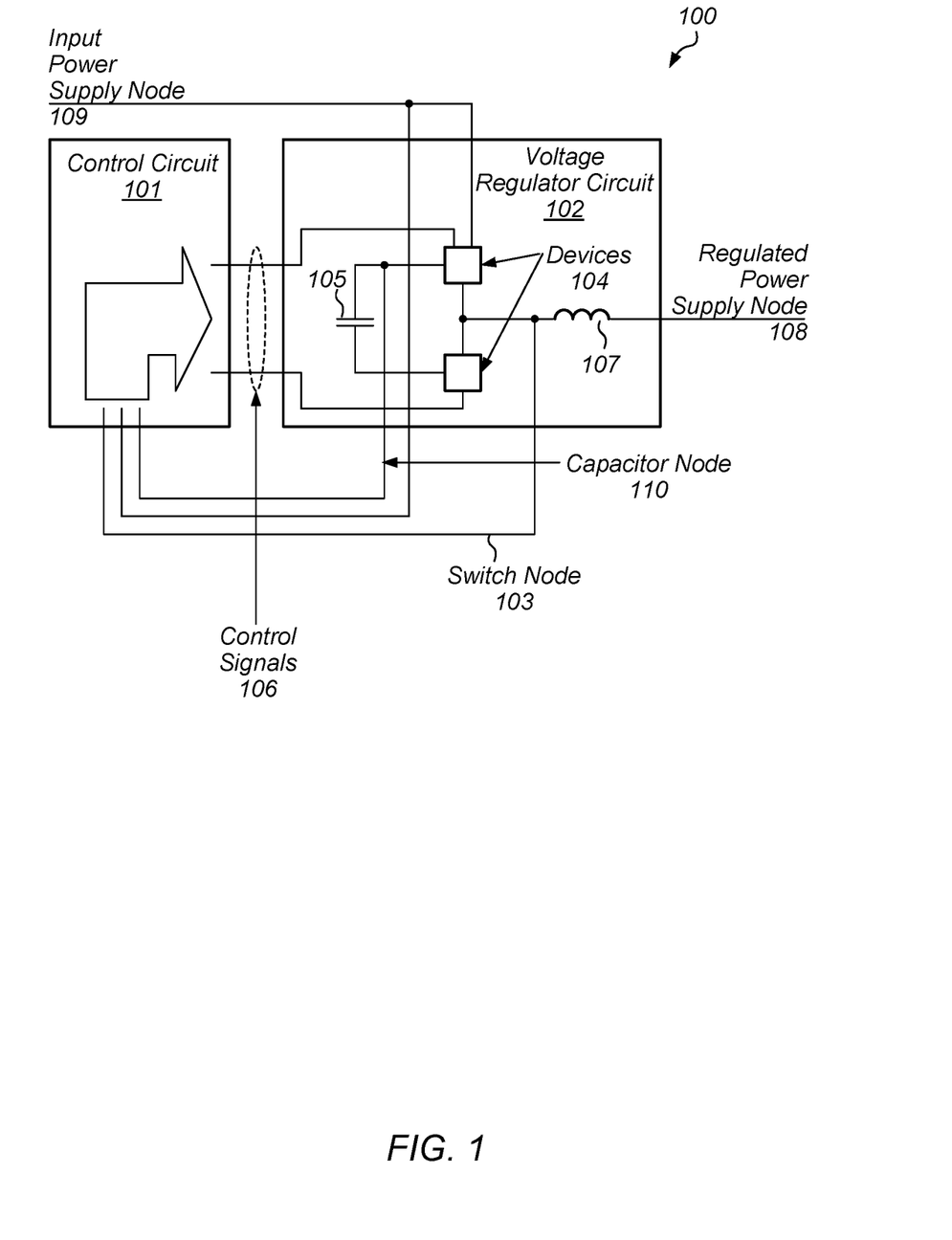
FIG. 1 is a block diagram of an embodiment of a power generator circuit for a computer system.

A block diagram of a power generator circuit included in a computer system is illustrated in FIG. 1. As illustrated, power generator circuit 100 includes control circuit 101 and voltage regulator circuit 102. Included in voltage regulator circuit 102 are fly capacitor 105, devices 104, and inductor 107. Devices 104 are coupled to fly capacitor 105 and switch node 103, and are controlled by control signals 106. Inductor 107 is coupled to switch node 103 and regulated power supply node 108.

Voltage regulator circuit 102 is configured to couple switch node 103 to fly capacitor 105 using different ones of devices 104 that are selected based on one or more control signals 106, and charge fly capacitor 105 using input power supply node 109 based on one or more control signals 106. In various embodiments, input power supply node 109 may be an output of another power generator circuit, an external power supply (e.g., a battery), or any other suitable source of energy.

Control circuit 101 is coupled to switch node 103, fly capacitor 105, and input power supply node 109, and is configured to sense a current through inductor 107 by selectively using, based on an operation mode, a voltage level across fly capacitor 105, a voltage level of switch node 103, and a voltage level of the input power supply node 109, and adjust one or more of control signals 106 based on a value of the current through the inductor 107. To adjust the one or more of control signals 106, control circuit 101 is further configured to adjust, during a first operation mode, the one of more control signals based on a zero-level crossing of the current through inductor 107. As used herein a zero-level crossing of the current through an inductor refers to a point at which the current flowing through an inductor in one direction, momentarily reaches a zero, and then begins to flow again in the opposite direction. In some cases, the first operation mode may be a discontinuous conduction mode.

The operation of control circuit 101 is, however, not limited to a single operation mode. In various embodiments, control circuit 101 is further configured to adjust, during a second operation mode, one or more of control signals 106 based on a peak level of the current through inductor 107. As used herein, a peak level of a current flowing through an inductor refers to a maximum value of a current flowing through the inductor. In some cases, the second operation mode includes a continuous conduction mode. As described below in more detail, for a given operation mode, control circuit 101 may adjust control signals 106 based on a ratio of a voltage level of regulated power supply node 108 and input power supply node 109.

Even through control circuit 101 adjusts control signals 106 based on different characteristics of the current through inductor 107 in different operation modes, portions of circuitry included in control circuit 101 may be shared, i.e., used in more than one operation mode, in order to save circuit area and minimize power dissipation of control circuit 101. For example, in some cases, control circuit 101 includes a comparator circuit and a plurality of switch devices configured to selectively couple switch node 103, capacitor node 110 (which is coupled to a terminal of fly capacitor 105), or input power supply node 109 to comparator input nodes. The comparator circuit may be configured to generate an output signal based on a comparison of respective voltage levels of the comparator input nodes.

It is noted that fly capacitor 105 and inductor 107 may be fabricated on a common integrated circuit with control circuit 101 and the remaining circuit elements included in voltage regulator circuit 102. In other embodiments, fly capacitor 105 and inductor 107 may be fabricated on different integrated circuit than control circuit 101 and the remaining circuit elements included in voltage regulator circuit 102, or may discrete circuit elements that are coupled to control circuit 101 and voltage regulator circuit 102 using a circuit board or other suitable substrate.

Figure 2:
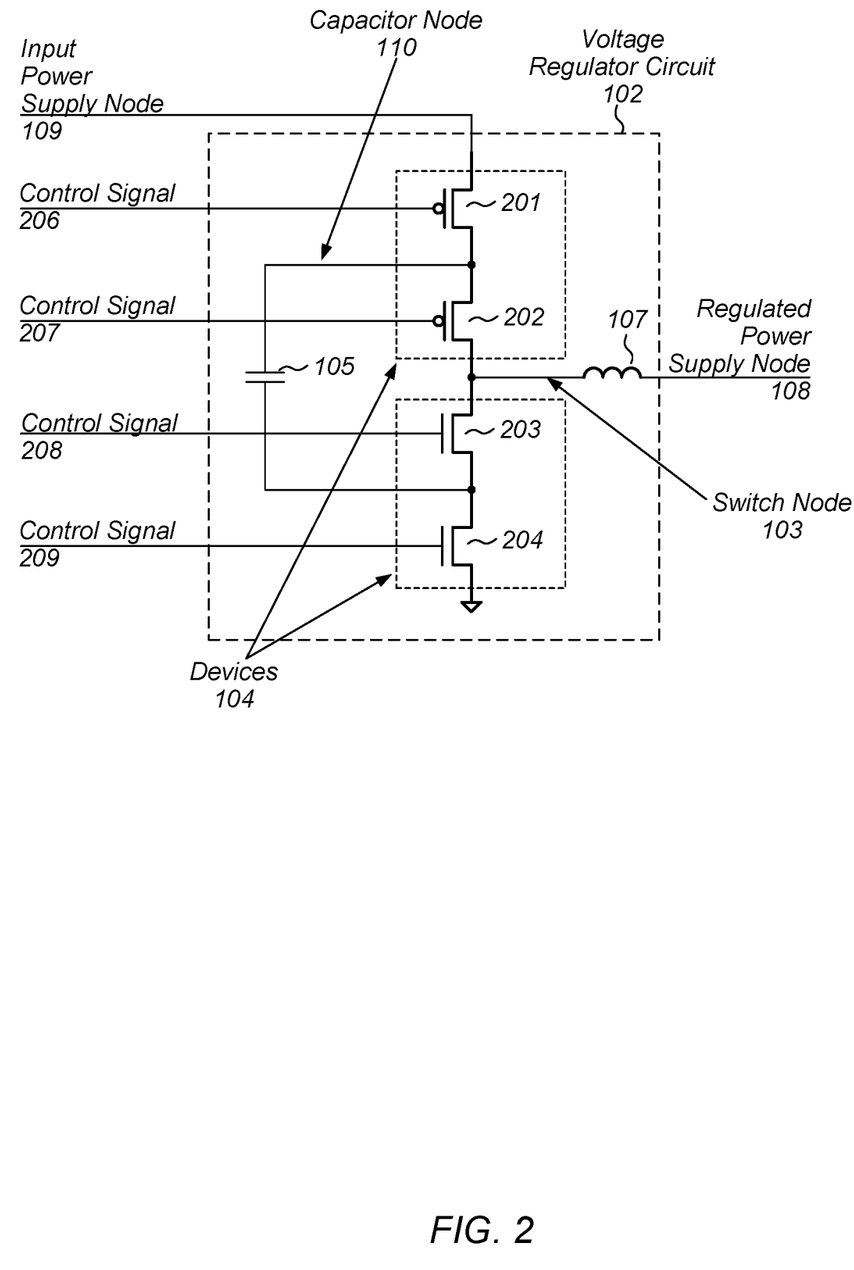
FIG. 2 illustrates a schematic diagram of an embodiment of a voltage regulator circuit included in a power generator circuit.

Voltage regulator circuits, such as voltage regulator circuit 102, may be designed according to one of various design styles. An example of a particular implementation of voltage regulator circuit 102 is depicted in FIG. 2. As illustrated, voltage regulator circuit 102 includes devices 104, inductor 107, and fly capacitor 105.

One terminal of fly capacitor 105 is coupled between devices 201 and 202, and the other terminal of fly capacitor 105 is coupled between devices 203 and 204. In various embodiments, fly capacitor 105 may be located on a same integrated circuit as voltage regulator circuit 102, and may be particular embodiment of a metal-oxide-metal (MOM) capacitor or any other suitable capacitor structure capable of being manufactured on an integrated circuit as part of a semiconductor manufacturing process. In other cases, fly capacitor 105 may be located on a different integrated circuit, or be a discrete component mounted on a board or other substrate to which an integrated circuit included voltage regulator circuit 102 is also mounted.

Devices 104 include devices 201 through 204. As illustrated, device 201 is coupled to input power supply node 109 and device 202, and is controlled by control signal 206. Device 202 is coupled to device 201 and switch node 103, and is controlled by control signal 207. In a similar fashion, device 203 is coupled between switch node 103 and device 204, while device 204 is coupled between a ground circuit node and device 203. Device 203 is controlled by control signal 208, and device 204 is controlled by control signal 209. In various embodiments, control signals 206-209 are included in control signals 106 as depicted in FIG. 1.

In various embodiments, each of devices 201 through 204 may a particular embodiment of a metal-oxide semiconductor field-effect transistor (MOSFET). For example, devices 201 and 202 may be p-channel MOSFETs, which are activated by low logic levels on control signals 206 and 207, respectively. Devices 203 and 204 may be n-channel MOSFETs, which are activate by high logic levels on control signals 208 and 209, respectively.

During operation, various ones of devices 201-204 may be activated according to one or more switching sequences. As described above, control circuit 101 may determine the duration of the active time for a particular cycle.

In some cases, a four cycle switching sequence is used. During a first cycle, devices 201 and 203 are active for the on-period of the cycle, while devices 202 and 204 are deactivated. With the particular arrangement of activated and deactivated devices, one terminal of fly capacitor 105 is coupled to input power supply node 109 and the other terminal of fly capacitor 105 is coupled to switch node 103, thereby charging fly capacitor 105. For the on-period of the first cycle, fly capacitor 105 will continue to be charged. As described below, at some point during the on-period of the first cycle, the voltage level of switch node 103 will be sampled. Once the on-period of the first cycle has elapsed, devices 201 and 203 will be deactivated for the remaining duration of the first cycle.

Following the first cycle, a second cycle is initiated. During the second cycle, devices 202 and 204 will be activated and devices 201 and 203 will remain deactivated. With devices 202 and 204 activated, one terminal of fly capacitor 105 is coupled to switch node 103, while the other terminal of fly capacitor 105 is coupled to a ground node, thereby discharging fly capacitor 105 into regulated power supply node 108 via inductor 107. As described below, the voltage level of switch node 103 will be sampled at some point during the on-period of the second cycle. In a similar fashion to the first cycle, fly capacitor 105 will continue to be discharged during the on-period of the second cycle. Once the on-period of the second cycle has elapsed, devices 202 and 204 will be deactivated, stopping the discharge of fly capacitor 105. Devices 201-204 will remain deactivated for the remaining duration of the second cycle.

As described below in more detail, the samples of the voltage level of switch node 103 may be compared and the on-periods of the first cycle and the second cycle adjusted based on the comparison of the voltage level samples. By adjusting the on-periods of the cycles, the voltage level across fly capacitor 105 may be maintained at a desired level. In some embodiments, the on-periods for the first and second cycles may be adjusted individually.

Although the operation of two of the four cycles has been described, it is noted that, in some embodiments, device activation in the third cycle is the same as that in the first cycle, and that device activation in the fourth cycle is the same as that in the second cycle. Alternatively, in other embodiments, the third and fourth cycles may have different arrangements of devices activated such that the voltage level across fly capacitor 105 does not change. It is further noted that different switching sequences that include different numbers of cycles, may also be employed and may be based on the ratio of the voltage level of the regulator power supply node 108 and input power supply node 109.

Figure 3:
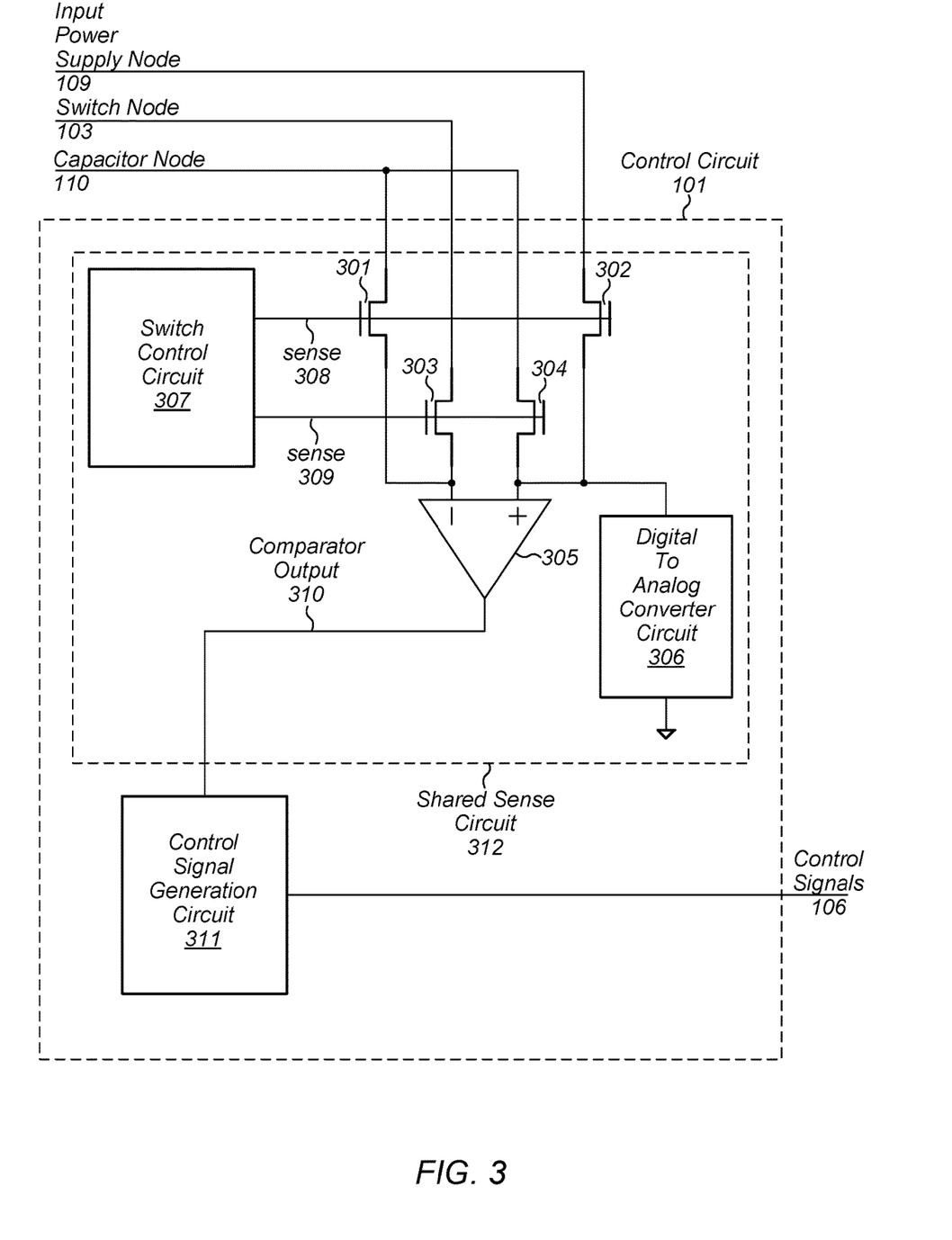
FIG. 3 illustrates a schematic diagram of an embodiment of a control circuit included in a power generator circuit.

Turning to FIG. 3, a schematic diagram of an embodiment of control circuit 101 is illustrated. As illustrated, control circuit 101 includes shared sense circuit 312 and control signal generation circuit 311. It is noted that, in other embodiments, control circuit 101 may include additional circuit blocks, which have been omitted in FIG. 3 for clarity.

As described above, control circuit 101 operates in multiple operation modes and under different operating conditions. In each combination of operation mode and condition, control circuit employs a common (or shared) sense circuit configured to sense particular characteristics of current flowing through inductor 107. An embodiment of such a shared sense circuit is illustrated in shared sense circuit 312. As illustrated, shared sense circuit 312 includes switch control circuit 307, devices 301-304, comparator circuit 305, and digital-to-analog converter circuit 306.

Device 301 is coupled between a negative input of comparator circuit 305 and capacitor node 110, and device 302 is coupled between a positive input of comparator circuit 305 and input power supply node 109. Both devices 301 and 302 are controlled by sense 308, which is generated by switch control circuit 307. Device 303 is coupled between the negative input of comparator circuit 305 and switch node 103, and device 304 is coupled between the positive input of comparator circuit 305 and capacitor node 110. Both devices 303 and 304 are controlled by sense 309, which is also generated by switch control circuit 307.

As illustrated, each of devices 301-304 is a particular embodiment of an n-channel MOSFET. In other embodiments, devices 301-304 may be implemented using other suitable transconductance devices, or multiple MOSFETs. For example, in some cases, devices 301-304 may be implemented as complementary metal-oxide semiconductor (CMOS) pass gates that include both n-channel and p-channel MOSFETs.

Switch control circuit 307 may be a particular embodiment of a state machine or other sequential logic circuit configured to generate sense 308 and 309 based on an operation mode of power generator circuit 100. For example, switch control circuit 307 may change respective logic levels of sense 308 and sense 309 based on whether power generator circuit 100 is operating in continuous conduction mode or discontinuous conduction mode. Additionally, switch control circuit 307 may change the respective logic levels of sense 308 and sense 309 based a current switching cycle of a plurality of switching cycles generated by control signal generation circuit 311.

Comparator circuit 305 may, in various embodiments, be a particular embodiment of a differential amplifier configured to generate a voltage level on comparator output 310 based on a difference level between its positive and negative inputs. In some cases, comparator circuit 305 may include bias circuits configured to set an operating point of comparator circuit 305, while in other cases, bias signals (not shown) may be generated separately from comparator circuit 305.

Digital-to-analog converter circuit 306 is configured to generate a current, which may be either sourced to or sunk from the positive input of comparator circuit 305. In various embodiments, digital-to-analog converter circuit 306 may determine a value of the current based on a set of data bits. Such data bits may be stored in a register (not shown) or other suitable storage circuit included in power generator circuit 100. In some cases, the data bits may be programmable, with initial values set during a boot or other setup routine. During operation, respective values of the data bits may be altered based on operation conditions, performance parameters, or any other suitable metric associated with the power generator circuit. The value of the current generated by digital-to-analog converter circuit 306 may be used in determining a peak value of the current flowing through inductor 107.

Control signal generation circuit 311 is configured to generate and adjust control signals 106. In various embodiments, control signal generation circuit 311 may be a particular embodiment of a state machine or other sequential logic circuit. Control signal generation circuit 311 may adjust the on-period of one or more of control signals 106 based on a value of comparator output 310. In some embodiments, a voltage level of comparator output 310 may adjust a value of one or more delay circuits included within control signal generation circuit 311. Alternatively, control signal generation circuit 311 may include an analog-to-digital converter circuit configured to generate a set of multiple data bits based on the voltage level of comparator output 310. The multiple data bit may then be used to select delay values, which determine the on-periods of control signals 106.

Figure 4:
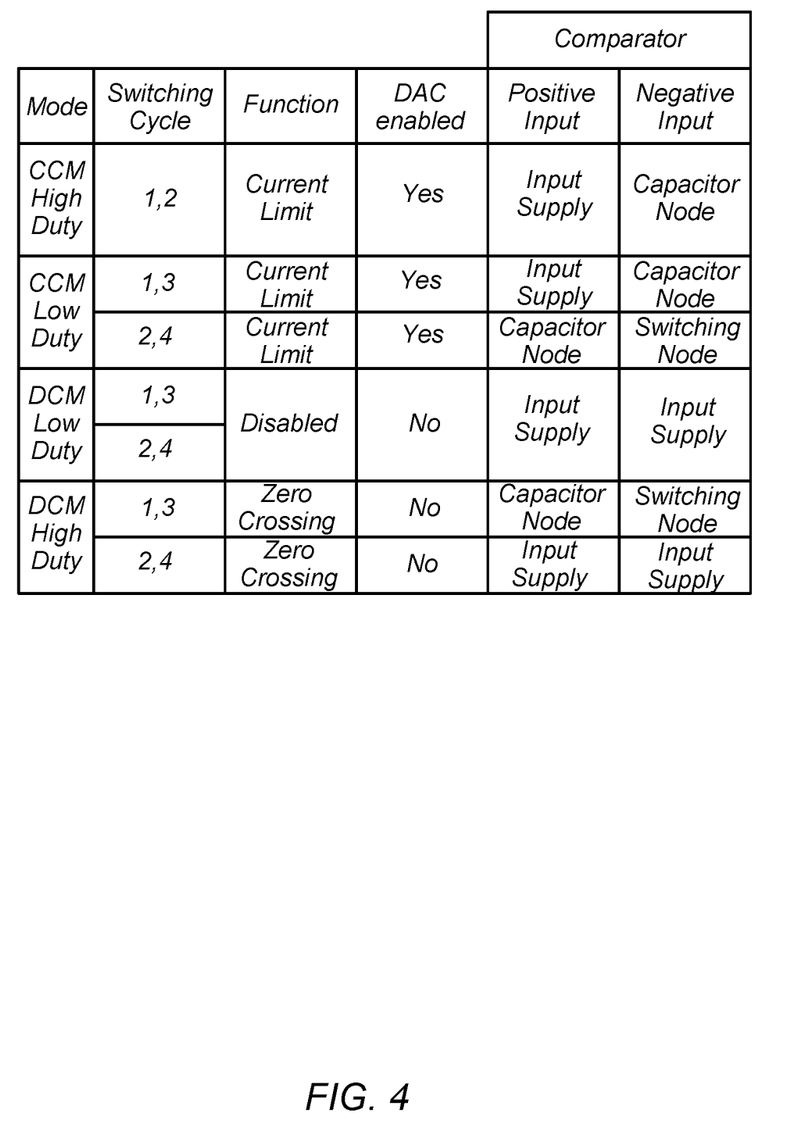
FIG. 4 illustrates a table describing the operating modes of a control circuit included in a power generator circuit.

As described above, adjustments may to control signal 106 by control circuit 101 depend not only on operation mode, but also on the ratio of the voltage levels of regulated power supply node 108 and input power supply node 109. This ratio (referred to herein as the "conversion ratio") may identify different regions of operation, which result in different switching cycles and different voltage level comparisons. FIG. 4 illustrates a table that depicts the different variations in operation.

In continuous conduction mode (CCM) with high duty (i.e., the conversion ratio is greater than 50%), during switching cycles 1 and 2, control circuit 101 functions in a current limit mode (i.e., checks for a peak current value), which is used to adjust the on-period during switching cycles 1 and 2. In this mode, digital-to-analog converter circuit 306 is active, and the positive input of comparator circuit 305 is coupled to input power supply node 109 and the negative input of comparator circuit 305 is coupled capacitor node 110.

In CCM with low duty (i.e., the conversion ratio is less than 50%), control circuit 101 also functions in the current limit mode and digital-to-analog converter circuit 306 is enabled. During switching cycles 1 and 3, the positive input of comparator circuit 305 is coupled to input power supply node 109 and the negative input of comparator circuit 305 is coupled to capacitor node 110. Alternatively, during switching cycles 2 and 4, the positive input of comparator circuit 305 is coupled to capacitor node 110 and the negative input of comparator circuit 305 is coupled to switch node 103.

When operating in discontinuous conduction mode (DCM), control circuit 101 operates differently for different ranges of the value of the conversion ratio. For low duty, the current detection operation of control circuit 101 is disabled along with digital-to-analog converter circuit 306, for switching cycles 1-4. Both the positive and negative inputs of comparator circuit 305 are coupled to input power supply node 109.

In DCM with high duty, control circuit 101 is configured to operate in zero crossing mode and used the detection of a zero-crossing point in the current flowing through inductor 107 to adjust the on-period in switching cycles 1-4. Digital-to-analog converter circuit 306 is disabled for each of switching cycles 1-4. During switching cycles 1 and 3, capacitor node 110 is coupled to the positive input of comparator circuit 305 and switch node 103 is coupled to the negative input of comparator circuit 305. During switching cycles 2 and 4, both the positive and negative inputs of comparator circuit 305 are coupled to input power supply node 109.

Figure 5:
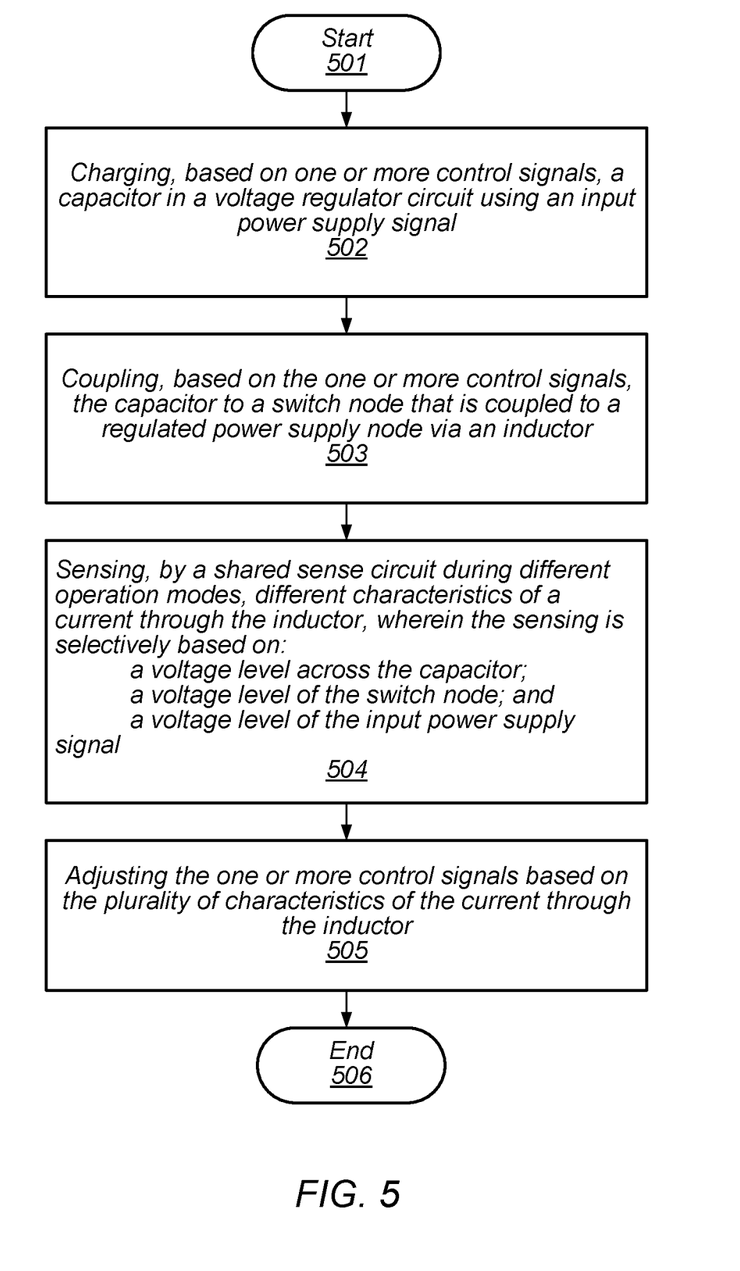
FIG. 5 illustrates a flow diagram depicting an embodiment of a method for sensing characteristics of inductor current in a voltage regulator circuit.

Turning to FIG. 5, a flow diagram depicting an embodiment of a method for sensing characteristics of inductor current in a voltage regulator circuit is illustrated The method, which begins in block 501, may be applied to power generator circuit 100 or any other suitable power generator or voltage regulator circuit.

The method includes charging, based on one or more control signals, a capacitor in a voltage regulator circuit using an input power supply signal (block 502). Additionally, the method includes coupling, based on the one or more control signals, the capacitor to a switch node that is coupled to a regulated power supply node via an inductor (block 503).

The method further includes sensing, by a shared sense circuit during different operation modes, different characteristics of a current through the inductor, wherein the sensing is selectively based on: a voltage level across the capacitor, a voltage level of the switch node, and a voltage level of the input power supply signal (block 504). In some embodiments, the different characteristics includes a zero-level crossing of the current through the inductor, and adjusting the one or more control signals includes adjusting, during a first operation mode, the one of more control signals based on the zero-level crossing of the current through the inductor. In such cases, the first operation mode may include a discontinuous conduction mode of operation.

Alternatively, the different characteristics may include a peak current through the inductor, and adjusting the one or more control signals includes adjusting, during a second operation mode, the one or more control signals based on the peak level of the current through the inductor. In such cases, the second operation mode may include a continuous conduction mode of operation.

In various embodiments, sensing, using the shared sense circuit, the different characteristics includes coupling the input power signal and a terminal of the capacitor to respective inputs of a comparator circuit during the first operation mode, and coupling the input power supply signal and the switch node to respective inputs of the comparator circuit during the second operation mode. Additionally, during the first operation mode, the method may include sinking, using a digital-to-analog converter circuit, a current from a particular input of the comparator circuit.

The method also includes adjusting the one or more control signals based on the plurality of characteristics of the current through the inductor (block 505). In some cases, different adjustments may be made during different ones of the operation modes. The method concludes in block 506.

Figure 6:
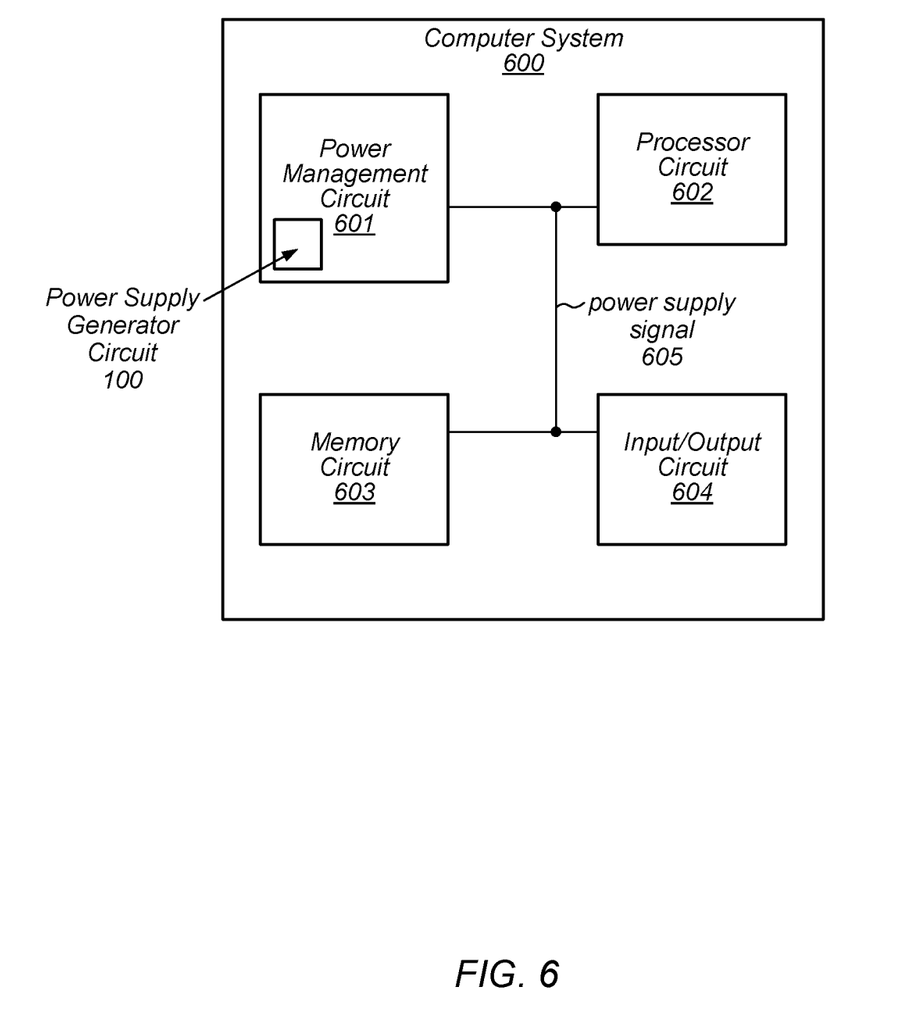
FIG. 6 is a block diagram of one embodiment of a computer system that includes a power generator circuit.

A block diagram of computer system is illustrated in FIG. 6. As illustrated embodiment, the computer system 600 includes power management unit 601, processor circuit 602, input/output circuits 604, and memory circuit 603, each of which is coupled to power supply signal 605. In various embodiments, computer system 600 may be a system-on-a-chip (SoC) and be configured for use in a desktop computer, server, or in a mobile computing application such as, a tablet, laptop computer, or wearable computing device.

Power management unit 601 includes power generator circuit 100 which is configured to generate a regulated voltage level on power supply signal 605 in order to provide power to processor circuit 602, input/output circuits 604, and memory circuit 603. Although power management unit 601 is depicted as including a single power generator circuit, in other embodiments, any suitable number of power generator circuits may be included in power management unit 601, each configured to generate a regulated voltage level on a respective one of multiple power supply signals included in computer system 600.

Processor circuit 602 may, in various embodiments, be representative of a general-purpose processor that performs computational operations. For example, processor circuit 602 may be a central processing unit (CPU) such as a microprocessor, a microcontroller, an application-specific integrated circuit (ASIC), or a field-programmable gate array (FPGA).

Memory circuit 603 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that in the embodiment of a computer system in FIG. 6, a single memory circuit is depicted. In other embodiments, any suitable number of memory circuits may be employed.

Input/output circuits 604 may be configured to coordinate data transfer between computer system 600 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 604 may be configured to implement a version of Universal Serial Bus (USB) protocol or IEEE 1394 (Firewire®) protocol.

Input/output circuits 604 may also be configured to coordinate data transfer between computer system 600 and one or more devices (e.g., other computing systems or integrated circuits) coupled to computer system 600 via a network. In one embodiment, input/output circuits 604 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 604 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a voltage regulator circuit including a first pair of devices coupled in a serial fashion between an input power supply node and a switch node, a second pair of devices coupled in a serial fashion between the switch node and a ground supply node, a capacitor coupled to the first pair of devices and the second pair of devices, and wherein the switch node coupled to a regulated power supply node via an inductor, wherein the voltage regulator circuit is configured to:
        couple the switch node to the capacitor using different ones of the first pair of devices and the second pair of devices that are selected based on one or more control signals; and
        charge the capacitor using the input power supply node based on the one or more control signals; and
    a control circuit configured to:
        sense a current through the inductor by selectively using, based on an operation mode, a voltage level across the capacitor, a voltage level of the switch node, and a voltage level of the input power supply node; and
        adjust the one or more control signals based on a value of the current through the inductor.

2. The apparatus of claim 1, wherein to adjust the one or more control signals, the control circuit is further configured to adjust, during a first operation mode, the one or more control signals based on a zero-level crossing of the current through the inductor.

3. The apparatus of claim 2, wherein the first operation mode includes the voltage regulator circuit operating in a discontinuous conduction mode.

4. The apparatus of claim 1, wherein to adjust the one or more control signals, the control circuit is further configured to adjust, during a second operation mode, the one or more control signals based on a peak level of the current through the inductor.

5. The apparatus of claim 4, wherein the second operation mode includes the voltage regulator circuit operating in a continuous conduction mode.

6. The apparatus of claim 4, wherein the control circuit includes a comparator circuit and a plurality of switch devices configured to selectively couple the switch node, a terminal of the capacitor, or the input power supply node to comparator input nodes, wherein the comparator circuit is configured to generate an output signal based on a comparison of respective voltage levels of the comparator input nodes.

7. A method, comprising:
    charging, based on one or more control signals, a capacitor in a voltage regulator circuit using an input power supply node, wherein the capacitor is coupled to a first pair of devices and a second pair of devices, wherein the first pair of devices are coupled in a serial fashion between the input power supply node and a switch node, wherein the second pair of devices are coupled in a serial fashion between the switch node and a ground supply node, and wherein the switch node is coupled to a regulated power supply node via an inductor;

coupling, based on the one or more control signals, the capacitor to the switch node;

sensing, by a shared sense circuit during different operation modes, a plurality of characteristics of a current through the inductor, wherein the sensing is selectively based on:
 a voltage level across the capacitor;
 a voltage level of the switch node; and
 a voltage level of the input power supply node; and adjusting the one or more control signals based on the plurality of characteristics of the current through the inductor.

8. The method of claim 7, wherein the plurality of characteristics includes a zero-level crossing of the current through the inductor, and wherein adjusting the one or more control signals includes adjusting, during a first operation mode, the one or more control signals based on the zero-level crossing of the current through the inductor.

9. The method of claim 8, wherein the first operation mode includes the voltage regulator circuit operating in a discontinuous conduction mode.

10. The method of claim 9, wherein the plurality of characteristics includes a peak level of the current through the inductor, and wherein adjusting the one or more control signals includes adjusting, during a second operation mode, the one or more control signals based on the peak level of the current through the inductor.

11. The method of claim 10, wherein the second operation mode includes the voltage regulator circuit operating in a continuous conduction mode.

12. The method of claim 7, wherein sensing, using the shared sense circuit, the plurality of characteristics includes:
 coupling the input power supply node and a terminal of the capacitor to respective inputs of a comparator circuit during a first operation mode; and
 coupling the input power supply node and the switch node to respective inputs of the comparator circuit during a second operation mode.

13. The method of claim 12, further comprising, sinking, using a digital-to-analog converter circuit, a current from a particular input of the comparator circuit during the first operation mode.

14. An apparatus, comprising:
 a processor coupled to a regulated power supply node; and
 a power generator circuit including a first pair of devices coupled in a serial fashion between an input power supply node and a switch node, a second pair of devices coupled in a serial fashion between the switch node and a ground supply node, a capacitor coupled to the first pair of devices and the second pair of devices, and wherein the switch node is coupled to the regulated power supply node via an inductor, wherein the power generator circuit is configured to:
  charge the capacitor using the input power supply node based on one or more control signals;
  couple, based on the one or more control signals, the capacitor to the switch node;
  sense, using a shared sense circuit included in the power generator circuit, a plurality of characteristics of a current through the inductor by selectively using, according to a selected operating mode, one or more of the following voltage levels:
   a voltage level across the capacitor;
   a voltage level of the switch node; and
   a voltage level of the input power supply node; and
  adjust the one or more control signals based on the plurality of characteristics of the current through the inductor.

15. The apparatus of claim 14, wherein the plurality of characteristics includes a zero-level crossing of the current through the inductor, and wherein to adjust the one or more control signals the power generator circuit is further configured to adjust, during a first operation mode, the one or more control signals based on the zero-level crossing of the current through the inductor.

16. The apparatus of claim 15, wherein the power generation circuit is configured to operation using discontinuous conduction in the first operation mode.

17. The apparatus of claim 14, wherein the plurality of characteristics includes a peak level of the current through the inductor, and wherein to adjust the one or more control signals the power generator circuit is further configured to adjust, during a second operation mode, the one or more control signals based on the peak level of the current through the inductor.

18. The apparatus of claim 17, wherein the second operation mode includes the power generator circuit operating in a continuous conduction mode.

19. The apparatus of claim 14, wherein the shared sense circuit includes a comparator circuit, and wherein to sense, using the shared sense circuit, the plurality of characteristics, the power generator circuit is further configured to:
 couple the input power supply node and a terminal of the capacitor to respective inputs of the comparator circuit during a first operation mode; and
 couple the input power supply node and the switch node to respective inputs of the comparator circuit during a second operation mode.

20. The apparatus of claim 19, wherein the shared sense circuit further includes a digital-to-analog converter circuit, and wherein the power generator circuit is further configured to sink, using the digital-to-analog converter circuit, a current from a particular input of the comparator circuit during the first operation mode.

* * * * *